US012646773B2

(12) United States Patent
Shibutani et al.

(10) Patent No.: US 12,646,773 B2
(45) Date of Patent: Jun. 2, 2026

(54) SEALED BATTERY

(71) Applicant: SANYO Electric Co., Ltd., Kadoma (JP)

(72) Inventors: Yoshihiro Shibutani, Osaka (JP); Shota Yatomi, Tokushima (JP); Yukishige Inaba, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 551 days.

(21) Appl. No.: 18/027,538

(22) PCT Filed: Oct. 5, 2021

(86) PCT No.: PCT/JP2021/036734
§ 371 (c)(1),
(2) Date: Mar. 21, 2023

(87) PCT Pub. No.: WO2022/080174
PCT Pub. Date: Apr. 21, 2022

(65) Prior Publication Data

US 2024/0021931 A1      Jan. 18, 2024

(30) Foreign Application Priority Data

Oct. 14, 2020     (JP) ................................. 2020-173031

(51) Int. Cl.
H01M 50/183       (2021.01)
H01M 10/0525      (2010.01)
(Continued)

(52) U.S. Cl.
CPC ..... H01M 50/183 (2021.01); H01M 10/0587 (2013.01); H01M 50/342 (2021.01); H01M 50/383 (2021.01); H01M 10/0525 (2013.01)

(58) Field of Classification Search
CPC ............. H01M 50/183; H01M 50/342; H01M 50/383; H01M 50/107; H01M 50/148;
(Continued)

(56) References Cited

U.S. PATENT DOCUMENTS

| | | | | |
|---|---|---|---|---|
| 2015/0132625 A1* | 5/2015 | Miyata | .............. | H01M 10/0525 429/94 |
| 2016/0365553 A1* | 12/2016 | Kountz | ............... | H01M 50/383 |
| 2022/0328926 A1* | 10/2022 | Shimizu | .............. | H01M 50/325 |

FOREIGN PATENT DOCUMENTS

| | | |
|---|---|---|
| CN | 205542914 U | 8/2016 |
| CN | 106654080 A | 5/2017 |

(Continued)

OTHER PUBLICATIONS

English Translation of JP2006260990A-Stacked Battery; Nissan Motor; Sep. 28, 2006 (Year: 2006).*

(Continued)

*Primary Examiner* — Adam J Francis
(74) *Attorney, Agent, or Firm* — WHDA, LLP

(57)                ABSTRACT

The present invention is for inhibiting ignition when an abnormality occurs in a battery. A sealed battery, which is one example of an embodiment of the present invention, comprises: an electrode body; a bottomed tubular outer housing can that accommodates the electrode body; and a sealing body that plugs an opening section of the outer housing can. The outer housing can or the sealing body has provided thereto an exhaust structure for discharging gas by breaking when internal pressure of the outer housing can exceeds a predetermined threshold. A sealed battery, which is one example of an embodiment of the present invention, comprises a potassium salt sheet that contains a potassium salt and that is disposed between an end surface of the electrode body and a bottom surface part of the outer
(Continued)

housing can having the exhaust structure or the sealing body having the exhaust structure.

5 Claims, 4 Drawing Sheets

(51) Int. Cl.
| | | |
|---|---|---|
| *H01M 10/0587* | (2010.01) |
| *H01M 50/342* | (2021.01) |
| *H01M 50/383* | (2021.01) |

(58) Field of Classification Search
CPC ............. H01M 50/167; H01M 50/186; H01M 50/193; H01M 50/392; H01M 50/394; H01M 50/474; H01M 50/477; H01M 50/489; H01M 50/536; H01M 50/538; H01M 50/559; H01M 50/572; H01M 10/0587; H01M 10/0525; Y02P 70/50
See application file for complete search history.

(56) References Cited

FOREIGN PATENT DOCUMENTS

| | | | | | |
|---|---|---|---|---|---|
| JP | H06-333548 | A | | 12/1994 | |
| JP | 9-161754 | A | | 6/1997 | |
| JP | 2006260990 | A | * | 9/2006 | |
| JP | 2009-218078 | A | | 9/2009 | |
| JP | 2009-301798 | A | | 12/2009 | |
| JP | 2013-168349 | A | | 8/2013 | |
| JP | 2013152871 | A | * | 8/2013 | |
| JP | 2013-187089 | A | | 9/2013 | |
| JP | 2016-110881 | A | | 6/2016 | |
| JP | 2017-525108 | A | | 8/2017 | |
| JP | 2019-33123 | A | | 2/2019 | |
| WO | WO-2019172119 | A1 | * | 9/2019 | .......... H01M 50/409 |
| WO | 2021/060472 | A1 | | 4/2021 | |

OTHER PUBLICATIONS

International Search Report dated Dec. 7, 2021, issued in counterpart International Application No. PCT/JP2021/036734 (3 pages).

* cited by examiner

SEALED BATTERY

CROSS-REFERENCE TO RELATED APPLICATION

This application is a National Phase Application filed under 35 U.S.C. § 371 of International Application No. PCT/JP2021/036734 filed on Oct. 5, 2021 which claims the benefit of priority under 35 U.S.C. § 119(a) of Japanese Patent Application No. 2020-173031 filed in Japan on Oct. 14, 2020, the contents of which are incorporated herein by reference.

TECHNICAL FIELD

The present disclosure generally relates to a sealed battery, and more particularly to a non-aqueous electrolyte secondary battery such as a lithium-ion battery.

BACKGROUND ART

On secondary batteries such as lithium-ion batteries, reported is a phenomenon of ignition from the battery caused by applying excessive impact form an outside or by exposing the battery to an abnormal temperature environment. For such a phenomenon, technical improvements to inhibit the battery ignition, such as improvement of a positive electrode material and improvement of an electrolyte liquid component, have been made. However, the batteries have been applied for on-board use, storage use, and the like, which require a high capacity, in recent years, and provided as a form of high-capacity module in which many batteries are electrically connected to be modularized. Thus, further safety measure has been desired.

The high-capacity module has a risk of considerable ignition accident by spreading fire from one ignited battery to around batteries. Thus, measures for preventing the fire spreading, such as disposing heat insulators between the batteries and preparing large space between the batteries, and exhaust space have been made, for example. However, such measures have problems of increase in a manufacturing cost of the module, decrease in an energy density, and the like. Considering such circumstances, proposed is a battery in which an exterior includes a fire extinguishing agent to inhibit the ignition (for example, see Patent Literature 1 to 3).

CITATION LIST

Patent Literature

PATENT LITERATURE 1: Japanese Unexamined Patent Application Publication No. 2019-033123
PATENT LITERATURE 2: Japanese Unexamined Patent Application Publication No. 2009-218078
PATENT LITERATURE 3: Japanese Unexamined Patent Application Publication No. 2009-301798

SUMMARY

Technical Problem

The batteries disclosed in Patent Literature 1 to 3 are considered to be able to efficiently inhibit the ignition. However, investigation by the present inventors have consequently found that a kind and position of the fire extinguishing agent significantly affect the ignition inhibition, and for example, some positions of the fire extinguishing agent exhibit almost no effect of inhibiting the ignition. Art of Patent literature 1 to 3 still has a room for improving the ignition inhibition.

Solution to Problem

A sealed battery according to the present disclosure comprises: an electrode assembly, a bottomed cylindrical outer housing can housing the electrode assembly; and a sealing assembly sealing an opening of the outer housing can, wherein in a bottom of the outer housing can or in the sealing assembly, an exhaust structure to exhaust a gas when an internal pressure of the outer housing can exceeds a predetermined threshold is provided, and the sealed battery comprising a potassium-salt sheet including a potassium salt, the potassium-salt sheet being disposed between: an end surface of the electrode assembly; and the bottom of the outer housing can provided with the exhaust structure or the sealing assembly provided with the exhaust structure.

Advantageous Effect of Invention

The sealed battery of the present disclosure may inhibit the ignition in occurrence of an abnormality. For example, the battery ignition is more certainly inhibited even when excessive impact is applied form an outside or when the battery is exposed to an abnormal temperature environment.

DESCRIPTION OF EMBODIMENTS

Hereinafter, an example of an embodiment of a sealed battery according to the present disclosure will be described in detail with reference to the drawings. It is previously anticipated to selectively combine a plurality of embodiments and modified examples described below.

Although a cylindrical battery 10 in which a wound electrode assembly 14 is housed in a bottomed cylindrical outer housing can 16 will be exemplified below as the sealed battery, the sealed battery according to the present disclosure is not limited to a cylindrical battery, and may be a rectangular battery comprising a bottomed rectangular outer housing can, for example. The electrode assembly is not limited to a wound electrode assembly in which a positive electrode and a negative electrode are wound with a separator interposed therebetween, and may be a stacked electrode assembly in which a plurality of positive electrodes and a plurality of negative electrodes are alternately stacked with a separator interposed therebetween.

Figure 1:
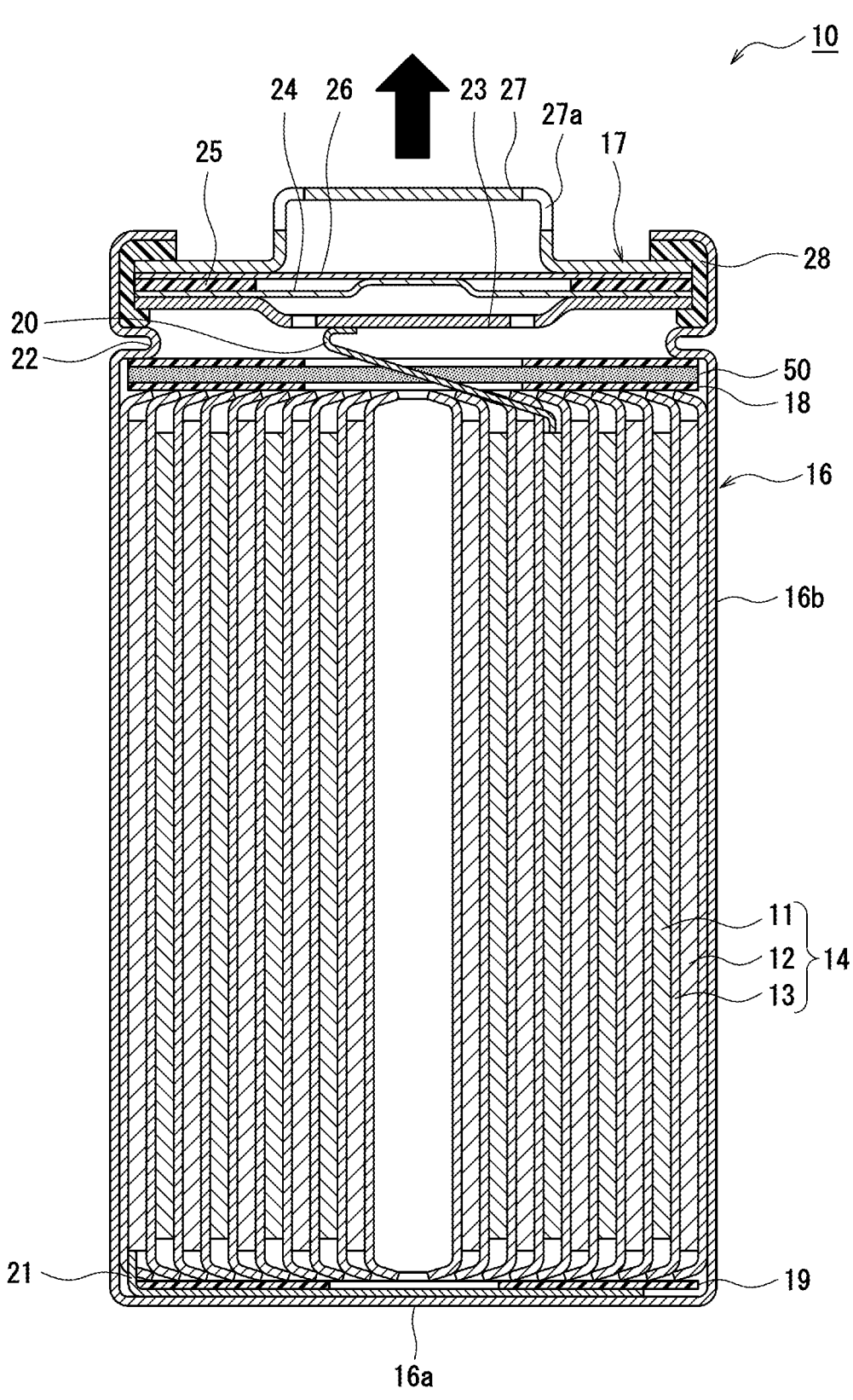
FIG. 1 is a sectional view of a cylindrical battery of an example of an embodiment.

FIG. 1 is a sectional view of the cylindrical battery 10 of an example of an embodiment. As illustrated in FIG. 1, the cylindrical battery 10 comprises the electrode assembly 14, the bottomed cylindrical outer housing can 16 housing the electrode assembly 14, and a sealing assembly 17 sealing an opening of the outer housing can 16. The electrode assembly 14 comprises a positive electrode 11, a negative electrode 12, and a separator 13, and has a wound structure in which the positive electrode 11 and the negative electrode 12 are spirally wound with the separator 13 interposed therebe- tween. The outer housing can 16 is a bottomed cylindrical metallic container having an opening at one side in the axial direction, and the opening of the outer housing can 16 is sealed with the sealing assembly 17. Hereinafter, for con- venience of description, the sealing assembly 17 side of the battery will be described as the upper side, and the bottom 16a side of the outer housing can 16 will be described as the lower side.

The cylindrical battery 10 comprises a non-aqueous elec- trolyte, for example. The non-aqueous electrolyte is housed in the outer housing can 16 together with the electrode assembly 14. The non-aqueous electrolyte includes a non- aqueous solvent and an electrolyte salt dissolved in the non-aqueous solvent. Examples of the non-aqueous solvent includes esters, ethers, nitriles, amides, and a mixed solvent of two or more thereof. The non-aqueous solvent may contain a halogen-substituted derivative in which hydrogen atom(s) of each of these solvents is at least partially substi- tuted with a halogen atom such as fluorine. For the electro- lyte salt, a lithium salt such as $LiPF_6$ is used. The electrolyte may be an aqueous electrolyte, or may be a solid electrolyte.

The positive electrode 11, the negative electrode 12, and the separator 13, which constitute the electrode assembly 14, are all a band-shaped elongated body, and spirally wound to be alternately stacked in a radial direction of the electrode assembly 14. To prevent precipitation of lithium, the nega- tive electrode 12 is formed to be one size larger than the positive electrode 11. That is, the negative electrode 12 is formed to be longer than the positive electrode 11 in a longitudinal direction and a width direction (short direction). The separator 13 is formed to be one size larger than at least the positive electrode 11, and, for example, two separators 13 are disposed so as to sandwich the positive electrode 11.

The electrode assembly 14 comprises: a positive electrode lead 20 connected to the positive electrode 11 by welding or the like; and a negative electrode lead 21 connected to the negative electrode 12 by welding or the like. In the present embodiment, the positive electrode lead 20 is connected to a central part of the longitudinal direction of the positive electrode 11. The negative electrode lead 21 is connected to a part positioned on an outside of the axial direction of the electrode assembly 14 in the negative electrode 12, for example, the outermost circumference surface of the elec- trode assembly 14. On the wound electrode assembly 14, a curved outer circumference surface is formed along the upper-lower direction (axial direction) to form each end surface on the upper and lower sides (both ends in the axial direction).

The outer housing can 16 has: a bottom 16a having a substantially circular shape viewed from the bottom surface; and a substantially cylindrical side wall 16b formed along the outer circumference of the bottom 16a. On the outer housing can 16, formed is a groove 22 in which a part of the side wall 16b projects inward and which supports the sealing assembly 17. The groove 22 is preferably formed in a circular shape along a circumferential direction of the outer housing can 16, and supports the sealing assembly 17 by the upper surface thereof. The sealing assembly 17 is fixed on the upper part of the outer housing can 16 by the groove 22 and by an edge of the opening of the outer housing can 16 caulked to the sealing assembly 17. A gasket 28 is provided between the outer housing can 16 and the sealing assembly 17 to achieve sealability inside the battery and to achieve insurability between the outer housing can 16 and the sealing assembly 17.

The sealing assembly 17 has a stacked structure of an internal terminal plate 23, a lower vent member 24, an insulating member 25, an upper vent member 26, and a cap 27 in this order from the electrode assembly 14 side. Each member constituting the sealing assembly 17 has, for example, a disk shape or a ring shape, and each member except for the insulating member 25 is electrically connected to each other. The lower vent member 24 and the upper vent member 26 are connected at respective central parts thereof, and the insulating member 25 is interposed between the respective circumferential parts of the vent members 24 and 26. On the internal terminal plate 23, a plurality of through holes are formed. On the cap 27, one or a plurality of openings 27a are formed.

In the present embodiment, an exhaust structure to exhaust a gas when an internal pressure of the outer housing can 16 exceeds a predetermined threshold is provided in the sealing assembly 17. When the internal pressure of the outer housing can 16 increases due to abnormal heat generation caused by nail piercing or the like, the lower vent member 24 is deformed so as to push up the upper vent member 26 toward the cap 27 side and then broken, and thereby a current passage between the lower vent member 24 and the upper vent member 26 is cut off. When the internal pressure further increases, the upper vent member 26 is broken, and the gas is exhausted through the opening 27a of the cap 27. In other words, an exhaust passage is formed on the sealing assembly 17 when the internal pressure of the outer housing can 16 exceeds a predetermined threshold.

In the example illustrated in FIG. 1, the exhaust structure is not provided in the outer housing can 16, and as illustrated with the arrow, the gas generated by abnormality of the battery is exhausted outward from the sealing assembly 17 side. In the sealing assembly 17, in order not to cause a problem of increase in the internal pressure which may burst the outer housing can 16 in occurrence of an abnormality of the battery, the vent members of the sealing assembly 17 are firstly broken to form the exhaust passage on the sealing assembly 17. As the detail will be described later, the cylindrical battery 10 comprises a potassium-salt sheet 50 between an upper end surface of the electrode assembly 14 and the sealing assembly 17 provided with the exhaust structure. The potassium-salt sheet 50 effectively inhibits the ignition in occurrence of an abnormality of the battery.

The cylindrical battery 10 comprises insulating plates interposed between each of the upper and lower end surfaces of the electrode assembly 14 and the outer housing can 16. The cylindrical battery 10 comprises an upper insulating plate 18 disposed above the electrode assembly 14 and a lower insulating plate 19 disposed under the electrode assembly 14, as the insulating plates. The upper insulating plate 18 is interposed between the electrode assembly 14 and the groove 22 of the outer housing can 16. The lower insulating plate 19 is interposed between the electrode assembly 14 and the bottom 16a of the outer housing can 16. Two of the upper insulating plates 18 are provided, and the two upper insulating plates 18 sandwich the potassium-salt sheet 50.

Figure 2:
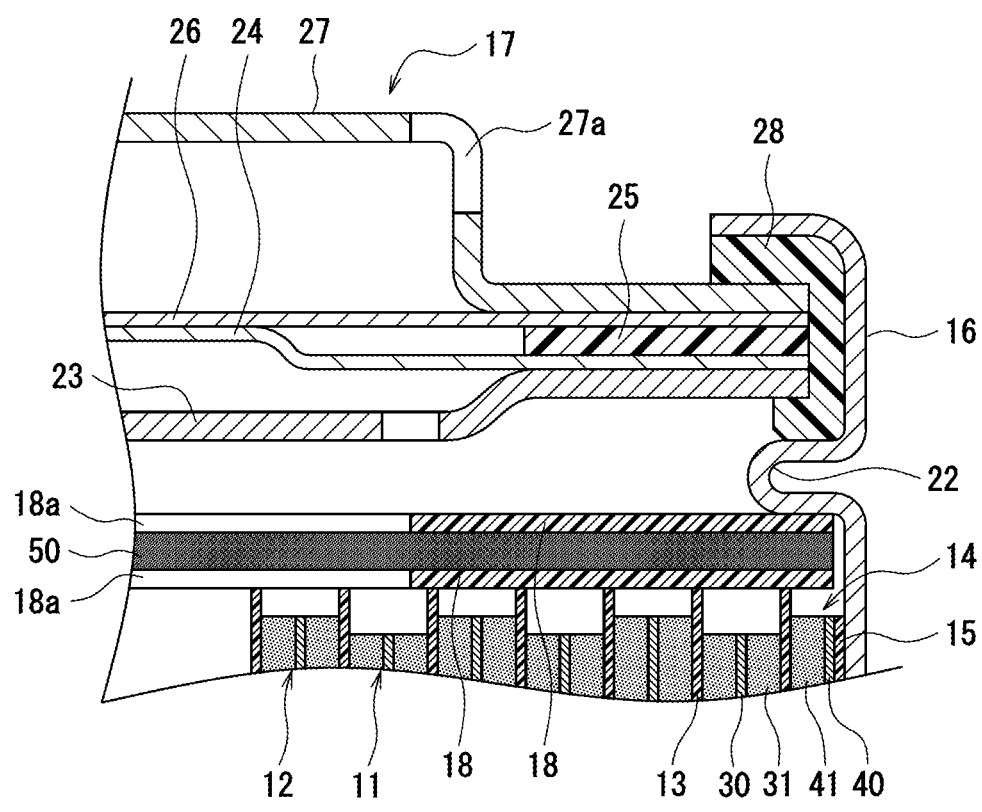
FIG. 2 is a sectional view illustrating an enlarged sealing assembly and its proximity of a cylindrical battery of an example of an embodiment.

Hereinafter, a constitution of the cylindrical battery 10, particularly the potassium-salt sheet 50, will be described in detail with reference to FIG. 2. FIG. 2 is a sectional view illustrating an enlarged sealing assembly 17 and its proxim- ity.

As illustrated in FIG. 2, the two upper insulating plates 18 and the potassium-salt sheet 50 are interposed between the upper end surface of the electrode assembly 14 and the sealing assembly 17. In the present embodiment, the positive electrode lead 20 is connected to the sealing assembly 17, and the sealing assembly 17 functions as a positive electrode terminal. Thus, the upper insulating plates 18 achieves insulation between the negative electrode 12 and the sealing assembly 17. The negative electrode lead 21 is connected to an inner surface of the bottom 16a of the outer housing can 16, and the outer housing can 16 functions as a negative electrode terminal. The circumference of the upper insulating plates 18 is interposed between the electrode assembly 14 and the groove 22 of the outer housing can 16 to achieve insulation between the positive electrode 11 and the outer housing can 16.

The positive electrode 11 has a positive electrode core 30 and a positive electrode mixture layer 31 formed on at least one surface of the positive electrode core 30. For the positive electrode core 30, a foil of a metal stable within a potential range of the positive electrode 11, such as aluminum and an aluminum alloy, a film in which such a metal is disposed on a surface layer thereof, and the like may be used. The positive electrode mixture layer 31 includes a positive electrode active material, a conductive agent such as acety-lene black, and a binder such as polyvinylidene fluoride, and is preferably provided on both surfaces of the positive electrode core 30. For the positive electrode active material, a lithium-transition metal composite oxide is used, for example.

The negative electrode 12 has a negative electrode core 40 and a negative electrode mixture layer 41 formed on at least one surface of the negative electrode core 40. For the negative electrode core 40, a foil of a metal stable within a potential range of the negative electrode 12, such as copper and a copper alloy, a film in which such a metal is disposed on a surface layer thereof, and the like may be used. The negative electrode mixture layer 41 includes a negative electrode active material and a binder such as styrene-butadiene rubber (SBR), and is preferably provided on both surfaces of the negative electrode core 40. For the negative electrode active material, a graphite, a silicon-containing compound, and the like are used, for example.

Onto the outermost circumference of the electrode assem-bly 14, a winding-stop tape 15 is attached to maintain the wound structure of the electrode assembly 14. The winding-stop tape 15 is attached onto, for example, the upper and lower end parts of the outermost circumference of the electrode assembly 14. An exposed surface of the negative electrode core 40 where the negative electrode mixture layer 41 is not formed may form the outermost circumference of the electrode assembly 14, and the negative electrode core 40 may be contacted with the inner circumference of the outer housing can 16, and the negative electrode 12 and the outer housing can 16 may be electrically connected. The lower insulating plate 19 is interposed between the lower end surface of the electrode assembly 14 and the bottom 16a of the outer housing can 16 to achieve insulation between the positive electrode 11 and the outer housing can 16.

The upper insulating plate 18 has a disk shape, and has an opening 18a formed on the central part in the axial direction. The opening 18a is a through hole for the positive electrode lead 20 to penetrate therethrough, and is also a passage of gas in occurrence of an abnormality. The positive electrode lead 20 extends through the openings 18a toward the sealing assembly 17 side, and is connected to the lower surface of the internal terminal plate 23 by welding or the like (see FIG.

1). The lower insulating plate 19 has a disk shape similar to the upper insulating plate 18, and has an opening formed on the central part in the axial direction. The negative electrode lead 21 extends through an outside of the lower insulating plate 19 toward the bottom 16a side of the outer housing can 16, and is connected to the inner surface of the bottom 16a by welding or the like (see FIG. 1). The opening of the lower insulating plate 19 exposes the negative electrode lead 21 disposed on the bottom 16a to enable to weld the negative electrode lead 21 with the bottom 16a.

The upper insulating plate 18 is a hard member having a disk shape and formed of an insulative resin as a main component (the same applies to the lower insulating plate 19). An example of the resin to form the upper insulating plate 18 is a polyolefin such as polypropylene, but is not particularly limited thereto, and may be a resin having higher heat resistance such as a phenol resin. The upper insulating plate 18 may include a non-conductive filler such as glass fiber. A thickness of the upper insulating plate 18 is, for example, from 0.05 mm to 0.5 mm, or from 0.1 mm to 0.3 mm. The opening 18a has, for example, a diameter being from 30% to 50% of the diameter (outer diameter) of the upper insulating plate 18, and formed by penetrating the central part in the axial direction of the upper insulating plate 18 in the thickness direction.

As noted above, the two upper insulating plates 18 are disposed above the electrode assembly 14. For the two upper insulating plates 18, hard resin plates having the same shape, size, and composition are used, for example. The two upper insulating plates 18 sandwich the potassium-salt sheet 50 to function as a support stably holding the potassium-salt sheet 50 between the upper end surface of the electrode assembly 14 and the sealing assembly 17. The sandwich structure in which the two hard upper insulating plates 18 sandwich the potassium-salt sheet 50 enables the potassium-salt sheet 50 to be present above the electrode assembly 14 even when the internal pressure of the outer housing can 16 increases and the gas is exhausted through the sealing assembly 17. In this case, the gas and the potassium salt effectively mix to highly inhibit the ignition.

The potassium-salt sheet 50 is a sheet including a potas-sium salt, and for example, constituted of the potassium salt and a binder. The potassium salt effectively functions as a fire extinguishing agent to inhibit the ignition by mixing it with the gas exhausted from the cylindrical battery 10. An example of preferable potassium salts include monopotas-sium citrate, tripotassium citrate, and dipotassium citrate. Among them, the potassium salt is preferably at least one selected from the group consisting of tripotassium citrate and dipotassium citrate.

The potassium-salt sheet 50 may be formed by, for example, rolling a mixed powder of the potassium salt and the binder with a roller into a sheet. Alternatively, the potassium-salt sheet 50 may also be produced by: preparing a slurry dispersing or dissolving the potassium salt and the binder; applying the slurry on a predetermined substrate; and then drying the coating film. For the binder, those same as the binders used for mixture layers of the positive electrode 11 and negative electrode 12, such as polyvinylidene fluo-ride and SBR, may be used. A thickness of the potassium-salt sheet 50 is not particularly limited, but preferably from 0.1 mm to 5.0 mm, or from 0.5 mm to 3.0 mm.

The potassium-salt sheet 50 is formed of the potassium salt as a main component. A content of the potassium salt is preferably no less than 60 mass % based on the total mass of the potassium-salt sheet 50. The content of the potassium salt is, for example, from 60 mass % to 98 mass %, from 70 mass % to 97 mass %, or from 80 mass % to 95 mass %. A higher content of the potassium salt may efficiently inhibit the ignition in occurrence of an abnormality of the battery. The mass of the potassium salt to be included in the cylindrical battery 10 is preferably determined considering the battery capacity. A higher battery capacity typically generates more heat in occurrence of an abnormality, and the addition amount of the potassium salt is preferably increased.

When the capacity of the cylindrical battery 10 is, for example, from 2 Ah to 4 Ah, an example of the mass of the potassium salt included in the outer housing can 16 is no less than 0.5 g, and more preferably no less than 1.0 g. The entire amount of the potassium salt is preferably present in the outer housing can 16 in the form of the potassium-salt sheet 50 disposed above the electrode assembly 14. An upper limit of the mass of the potassium salt is not particularly limited from the viewpoint of the ignition inhibition, but a preferable upper limit thereof is 3.0 g considering a balance with the battery capacity and the like. An example of a preferable cylindrical battery 10 has a battery capacity of from 2.5 Ah to 3.5 Ah, and a mass of the potassium salt included in the outer housing can 16 of from 0.5 g to 3.0 g.

The potassium-salt sheet 50 is preferably disposed so as to cover substantially entirely the upper end surface of the electrode assembly 14. In other words, the potassium-salt sheet 50 is preferably disposed so as to seal the exhaust passage directing from the electrode assembly 14 to the sealing assembly 17. In this case, for example, gas generated from the electrode assembly 14 by abnormal heat generation that is caused by internal short circuit or the like due to nail piercing is considered to be mixed effectively with the potassium salt before it is exhausted to the outside through the exhaust structure of the sealing assembly 17, and thus the ignition is highly inhibited. Note that the potassium-salt sheet 50 does not inhibit the gas exhaustion, and thus disposition as above of the potassium-salt sheet 50 does not inhibit smooth exhaustion of the gas.

As noted above, the potassium-salt sheet 50 is sandwiched by the two upper insulating plates 18. The opening 18a is each formed in the two upper insulating plates 18, and the potassium-salt sheet 50 is provided so as to seal the openings 18a. That is, between the two upper insulating plates 18, a part where the openings 18a are not formed, such as the circumference of the upper insulating plates 18, has a three-layer structure of the upper insulating plate 18/the potassium-salt sheet 50/the upper insulating plate 18. In apart where the openings 18a are formed, only the potassium-salt sheet 50 is present. Since the gas passes through the openings 18a in occurrence of an abnormality of the battery, it is effective to provide the potassium-salt sheet 50 on the openings 18a.

The potassium-salt sheet 50 has, for example, the same diameter as the upper insulating plate 18, and is formed in a disk shape. The two upper insulating plates 18 and the potassium-salt sheet 50 are stacked so that the outer circumferences thereof correspond each other. The two upper insulating plates 18 are disposed so as to lay the openings 18a on each other, and the positive electrode lead 20 through the openings 18a penetrates the potassium-salt sheet 50.

Figure 3:
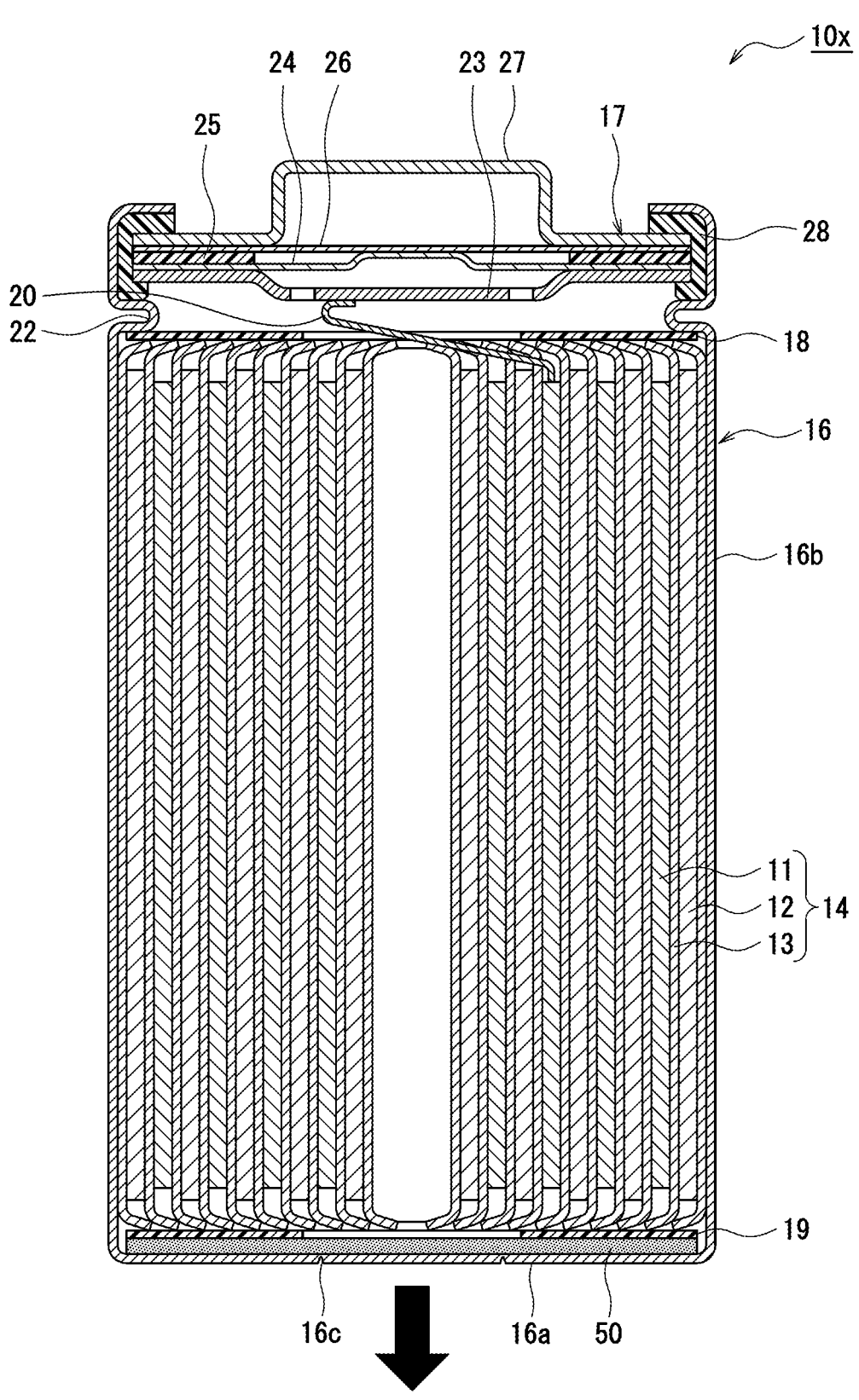
FIG. 3 is a sectional view of a cylindrical battery of another example of an embodiment.
Figure 4:
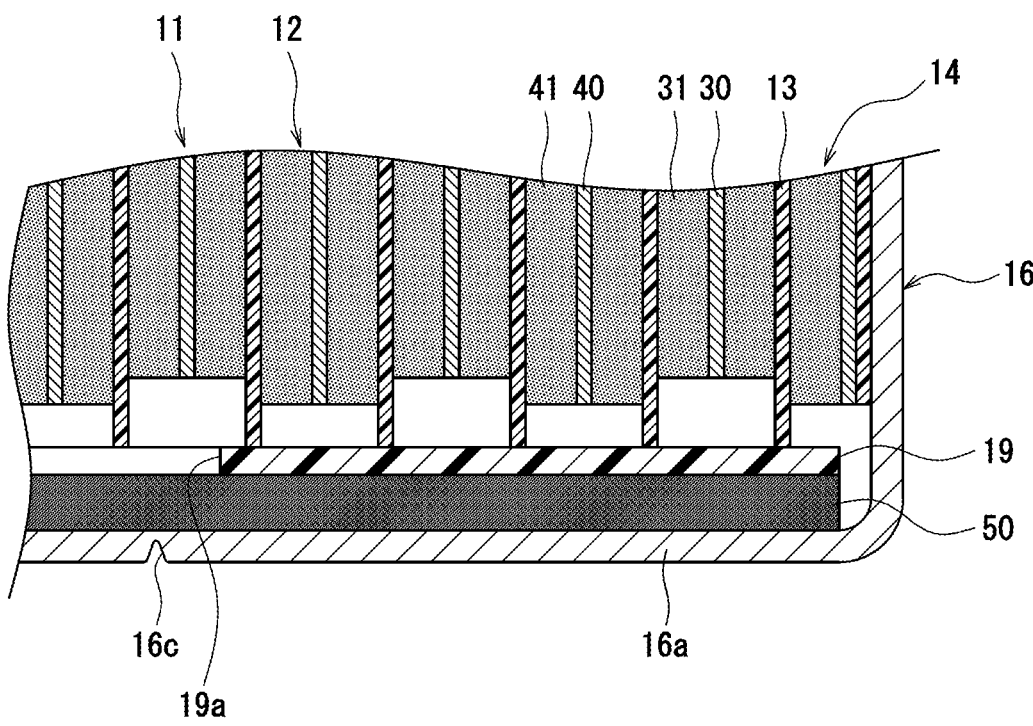
FIG. 4 is a sectional view illustrating an enlarged bottom of an outer housing can and its proximity of a cylindrical battery of another example of an embodiment.

Hereinafter, a cylindrical battery 10x of another example of an embodiment will be described with reference to FIG. 3 and FIG. 4. FIG. 3 is a sectional view illustrating an entirety of the cylindrical battery 10x. FIG. 4 is a sectional view illustrating an enlarged bottom 16a of the outer housing can 16 and its proximity. Hereinafter, differences from the above embodiment will be described, and a repetitive description will be omitted.

As illustrated in FIG. 3 and FIG. 4, the cylindrical battery 10x has an engraved mark 16c formed on the bottom 16a of the outer housing can 16, and differs from the cylindrical battery 10 in terms of the potassium-salt sheet 50 interposed between the lower end surface of the electrode assembly 14 and the bottom 16a. The engraved mark 16c is, for example, a ring-shaped or C-shaped groove formed on an outer surface of the bottom 16a. In the bottom 16a, a portion where the engraved mark 16c is formed is thinner than the other portion, and firstly brakes when the internal pressure of the outer housing can 16 increases. That is, an opening to exhaust the gas is to be formed at a portion surrounded by the engraved mark 16c of the bottom 16a.

In the cylindrical battery 10x, the exhaust structure is provided in the bottom 16a of the outer housing can 16, and between the lower end surface of the electrode assembly 14 and the bottom 16a, the potassium-salt sheet 50 and the lower insulating plate 19 are overlapped and interposed in this order from the bottom 16a side. The potassium-salt sheet 50 is in a state where being sandwiched by the bottom 16a and the lower insulating plate 19 from the upper and lower sides. In the cylindrical battery 10x, no opening is formed on the cap 27 of the sealing assembly 17, and no exhaust structure is provided in the sealing assembly 17. Between the electrode assembly 14 and the groove 22, only one upper insulating plate 18 is interposed.

The potassium-salt sheet 50 is preferably disposed so as to cover substantially entirely the lower end surface of the electrode assembly 14. That is, similar to the case of the cylindrical battery 10, the potassium-salt sheet 50 is preferably disposed so as to seal the exhaust passage directing from the electrode assembly 14 to the bottom 16a. The opening 19a is formed on the lower insulating plate 19, and the potassium-salt sheet 50 is formed in a disk shape so as not to have an opening, and provided so as to seal the opening 19a. The potassium-salt sheet 50 has, for example, the same diameter as the lower insulating plate 19, and stacked so that each of the outer circumferences thereof corresponds to each other.

Preferable thickness, composition, and the like of the potassium-salt sheet 50 of the cylindrical battery 10x are same as the case of the potassium-salt sheet 50 of the cylindrical battery 10. The potassium-salt sheet 50 may be sandwiched by two lower insulating plates 19. The potassium-salt sheet 50 of the cylindrical batteries 10 and 10x is not limited to the sheet including the potassium salt and the binder. For example, a sheet in which a gallium salt is added into a resin constituting the insulating plate, such as a polyolefin, a sheet in which the potassium salt coats the surface of the insulating plate, and the like may also be used.

EXAMPLES

Hereinafter, the present disclosure will be further described with Examples, but the present disclosure is not limited to these Examples.

Example 1

[Production of Positive Electrode]

For a positive electrode active material, lithium nickel-cobaltate was used. The positive electrode active material, graphite, and polyvinylidene fluoride (PVDF) were mixed at a solid content mass ratio of 90.3:4.7:5, and N-methyl-2- pyrrolidone (NMP) was used as a dispersion medium to prepare a positive electrode mixture slurry. Then, the positive electrode mixture slurry was applied on a positive electrode core made of aluminum foil having a thickness of 20 μm, the coating film was dried and compressed by using a roll pressing machine so that a mixture layer density was 3.5 g/cc, and then cut to a predetermined electrode size to produce a positive electrode. A lead made of aluminum was welded with a core exposed part where the positive electrode mixture slurry was not applied.

[Production of Negative Electrode]

For a negative electrode active material, artificial graphite was used. The negative electrode active material, carboxymethylcellulose, and styrene-butadiene rubber (SBR) were mixed at a solid content mass ratio of 96:2:2, and water was used as a dispersion medium to prepare a negative electrode mixture slurry. Then, the negative electrode mixture slurry was applied on a negative electrode core made of copper foil having a thickness of 15 μm, the coating film was dried and compressed by using a roll pressing machine so that a mixture layer density was 1.5 g/cc, and then cut to a predetermined electrode size to produce a negative electrode. A lead made of nickel was welded with a core exposed part where the negative electrode mixture slurry was not applied.

[Production of Electrode Assembly]

Using a winding core with 4 mm in diameter, the above positive electrode and the above negative electrode were spirally wound with a separator composed of a polyolefin porous film interposed therebetween by a winding machine, and an insulative winding-stop tape was attached to the terminal winding part. Thereafter, the winding core was removed to obtain a wound electrode assembly.

[Preparation of Non-Aqueous Electrolyte Liquid]

Ethylene carbonate, ethyl methyl carbonate, and dimethyl carbonate were mixed at a volume ratio of 20:20:60 (in terms of 1 atm and 25° C.). Into this mixed solvent, $LiPF_6$ was added so that the concentration is 1 M to prepare a non-aqueous electrolyte liquid.

[Production of Cylindrical Battery]

Into a bottomed cylindrical outer housing can with 65 mm in height and 18 mm in diameter, the above electrode assembly was housed, and an upper insulating plate was disposed above the electrode assembly. On this insulating plate, a potassium-salt sheet and an upper insulating plate were disposed in this order for sandwiching the potassium-salt sheet with the two insulating plates to form a sandwich structure. Between a lower end surface of the electrode assembly and a bottom of the outer housing can, a lower insulating plate was interposed. The potassium-salt sheet was a product in which a mixture of 1 g of tripotassium citrate and 0.05 g of SBR was processed into a sheet with 500 μm in thickness. The upper insulating plate is a resin plate made of polypropylene with 500 μm in thickness, and has an opening for the positive electrode lead to be passed therethrough. As illustrated in FIG. 1, the potassium-salt sheet was disposed so as to seal the opening of the upper insulating plate and entirely cover the upper end surface of the electrode assembly.

Then, a groove was formed on an upper part of the outer housing can, the above electrolyte liquid was injected into the outer housing can, and then a sealing assembly was attached to the opening of the outer housing can with a gasket interposed therebetween. Then, an opening edge part of the outer housing can was caulked with the sealing assembly to produce a cylindrical battery in which the opening of the outer housing can was sealed with the sealing assembly (capacity: 3 Ah). The positive electrode lead was welded with an internal terminal plate of the sealing assembly, and the negative electrode lead was welded with the bottom of the outer housing can. The sealing assembly had an exhaust structure illustrated in FIG. 1.

Example 2

A cylindrical battery was produced in the same manner as in Example 1 except that dipotassium citrate was used instead of tripotassium citrate as the potassium salt to constitute the potassium-salt sheet.

Example 3

As the outer housing can, an outer housing can having an exhaust structure (engraved mark on the bottom) illustrated in FIG. 3 was used. For the sealing assembly, a sealing assembly having no exhaust structure was used. On the bottom of the outer housing can having the formed engraved mark, a lower insulating plate made of polypropylene (thickness: 500 μm) was disposed, and a potassium-salt sheet and a lower insulating plate were disposed thereon in this order to form a sandwich structure in which the two insulating plates sandwiched the potassium-salt sheet. On the electrode assembly, an upper insulating plate made of polypropylene was disposed. Other constitutions were same as of Example 1 to produce a cylindrical battery.

Example 4

A cylindrical battery was produced in the same manner as in Example 3 except that dipotassium citrate was used instead of tripotassium citrate as the potassium salt to constitute the potassium-salt sheet.

Example 5

A cylindrical battery was produced in the same manner as in Example 3 except that the mass of tripotassium citrate included in the potassium-salt sheet was changed to 0.5 g.

Example 6

A cylindrical battery was produced in the same manner as in Example 3 except that the mass of tripotassium citrate included in the potassium-salt sheet was changed to 3.0 g.

Example 7

A cylindrical battery was produced in the same manner as in Example 1 except that: as the outer housing can, an outer housing can having an exhaust structure (engraved mark on the bottom) illustrated in FIG. 3 was used; and as the sealing assembly, a sealing assembly having no exhaust structure was used. That is, above the electrode assembly, the potassium-salt sheet sandwiched by the two upper insulating plates was disposed.

Example 8

A cylindrical battery was produced in the same manner as in Example 7 except that dipotassium citrate was used instead of tripotassium citrate as the potassium salt to constitute the potassium-salt sheet.

Example 9

On a bottom of an outer housing can having no engraved mark, a lower insulating plate made of polypropylene was disposed thereon, and a potassium-salt sheet and a lower insulating plate were disposed thereon in this order to form a sandwich structure in which the two insulating plates sandwiched the potassium-salt sheet. Above the electrode assembly, an upper insulating plate made of polypropylene was disposed. Other constitutions were same as of Example 1 to produce a cylindrical battery.

Example 10

A cylindrical battery was produced in the same manner as in Example 9 except that dipotassium citrate was used instead of tripotassium citrate as the potassium salt to constitute the potassium-salt sheet.

Example 11

A cylindrical battery was produced in the same manner as in Example 1 except that: the electrode assembly was inserted into the outer housing can in a state where the potassium-salt sheet was wound around the outer circumference of the electrode assembly; and a single layer of the upper insulating plate was used instead of the sandwich structure of the upper insulating plate/the potassium-salt sheet/the upper insulating plate.

Example 12

A cylindrical battery was produced in the same manner as in Example 11 except that dipotassium citrate was used instead of tripotassium citrate as the potassium salt to constitute the potassium-salt sheet.

Example 13

A cylindrical battery was produced in the same manner as in Example 1 except that: the electrode assembly was inserted into the outer housing can in a state where the potassium-salt sheet was filled in the central part (winding center) of the electrode assembly; and a single layer of the upper insulating plate was used instead of the sandwich structure of the upper insulating plate/the potassium-salt sheet/the upper insulating plate.

Example 14

A cylindrical battery was produced in the same manner as in Example 13 except that dipotassium citrate was used instead of tripotassium citrate as the potassium salt to constitute the potassium-salt sheet.

Example 15

A cylindrical battery was produced in the same manner as in Example 1 except that a single layer of the upper insulating plate was used instead of the sandwich structure of the upper insulating plate/the potassium-salt sheet/the upper insulating plate.

[Nail Piercing Test]

Each of the cylindrical batteries of Examples and Comparative Examples was tested under the following procedure by using a pressure-resistant nail piercing tester equipped with a pressure sensor and a temperature sensor. Table 1 shows the test results. The test result is an average value of test results performed on each battery three times.

(1) Under an environment at 25° C. a battery was charged at a constant current of 0.3 C until a battery voltage reached 4.2 V, and then subsequently charged at the constant voltage until a current value reached 0.05° C.

(2) Under an environment at 25° C., a tip of a round nail with 3 mm in thickness was contacted with a central part on a side wall of the battery charged in (1). The battery was pierced by the round nail at a rate of 10 mm/sec in the diameter direction of the battery, and the piercing with the round nail was stopped when the round nail completely pierced the battery.

(3) A highest temperature of gas exhausted from the battery and a highest pressure in the tester were measured. Then, occurrence or non-occurrence of ignition was checked by visual observation.

| | Potassium-salt sheet | | | | Nail piercing test | | |
| | | | | | Internal | | Occurrence |
| | Potassium salt | Addition amount | Position | Position of exhaust structure | pressure of tester | Temperature | of ignition |
| --- | --- | --- | --- | --- | --- | --- | --- |
| Example 1 | Tripotassium citrate | 1 g | Above electrode assembly | Sealing assembly | 10 kPa | 410° C. | No |
| Example 2 | Dipotassium citrate | 1 g | Above electrode assembly | Sealing assembly | 11 kPa | 420° C. | No |
| Example 3 | Tripotassium citrate | 1 g | Under electrode assembly | Bottom of outer housing can | 12 kPa | 400° C. | No |
| Example 4 | Dipotassium citrate | 1 g | Under electrode assembly | Bottom of outer housing can | 10 kPa | 405° C. | No |
| Example 5 | Tripotassium citrate | 0.5 g | Under electrode assembly | Bottom of outer housing can | 20 kPa | 750° C. | Slightly yes |
| Example 6 | Tripotassium citrate | 3 g | Under electrode assembly | Bottom of outer housing can | 10 kPa | 400° C. | No |
| Example ? | Trpotassium citrate | 1 g | Above electrode assembly | Bottom of outer housing can | 30 kPa | 1000° C. | Yes |
| Example 8 | Dipotassium citrate | 1 g | Above electrode assembly | Bottom of outer housing can | 31 kPa | 1010° C. | Yes |
| Example 9 | Tripotassium citrate | 1 g | Under electrode assembly | Sealing assembly | 31 kPa | 1000° C. | Yes |
| Example 10 | Dipotassium citrate | 1 g | Under electrode assembly | Sealing assembly | 30 kPa | 1010° C. | Yes |
| Example 11 | Tripotassium citrate | 1 g | Outer circumference of electrode assembly | Sealing assembly | 29 kPa | 990° C. | Yes |
| Example 12 | Dipotassium citrate | 1 g | Outer circumference of electrode assembly | Sealing assembly | 30 kPa | 1005° C. | Yes |
| Example 13 | Tripotassium citrate | 1 g | Center of electrode assembly | Sealing assembly | 30 kPa | 995° C. | Yes |
| Example 14 | Dipotassium citrate | 1 g | Center of electrode assembly | Sealing assembly | 28 kPa | 1000° C. | Yes |
| Example 15 | None | — | — | Sealing assembly | 30 kPa | 1000° C. | Yes |

As shown in Table 1, any batteries of Examples 1 to 4 hardly cause ignition in the nail piercing test, and can remarkably reduce the pressure of the exhausted gas and rise in the temperature compared with the batteries of Examples 7 to 10. In the batteries of Examples 1 to 4, the potassium-salt sheet is disposed on the exhaust passage directing from the electrode assembly to sealing assembly or to the bottom of the outer housing can so as to cover the end surface of the electrode assembly to be a gas generation source. Thus, the gas and the potassium salt are considered to effectively mix to form a state where the gas is hardly fired.

In the batteries of Examples 7 to 10, no specific effect was observed in the nail piercing test as compared with the battery of Example 15, which used no potassium-salt sheet. The batteries of Examples 11 and 12, which disposed the potassium-salt sheet so as to cover the outer circumference of the electrode assembly, and the batteries of Examples 13 and 14, which disposed the potassium-salt sheet at the winding center of the electrode assembly, also exhibited the same results as of the battery of Example 15. That is, it is understood that the position of the potassium-salt sheet significantly affects the ignition inhibition, and the positions of Examples 7 to 14 yield no effect of ignition inhibition.

Although the battery of Example 5 reduced the amount of the added potassium salt by 50% from the battery of Example 4, the remarkable effect of the ignition inhibition was also obtained in this case. Note that, slight ignition (flame in a short time) was observed. Accordingly, the addition amount of the potassium salt is more preferably 1.0 g than 0.5 g in a case where the battery capacity is approximately 3 Ah. Between the battery of Example 6, which added 3.0 g of the potassium salt, and the batteries of Examples 7 to 10, no large difference in the effect of the ignition inhibition was observed. As noted above, the addition amount of the potassium salt is preferably determined considering a balance with the battery capacity.

REFERENCE SIGNS LIST

10, 10x Cylindrical battery, 11 Positive electrode, 12 Negative electrode, 13 Separator, 14 Electrode assembly, 15 Winding-stop tape, 16 Outer housing can, 16a Bottom, 16b Side wall, 16c Engraved mark, 17 Sealing assembly, 18 Upper insulating plate, 18a, 19a, 27a Opening, 19 Lower insulating plate, 20 Positive electrode lead, 21 Negative electrode lead, 22 Groove, 23 Internal terminal plate, 24 Lower vent member, 25 Insulating member, 26 Upper vent member, 27 Cap, 28 Gasket, 30 Positive electrode core, 31 Positive electrode mixture layer, 40 Negative electrode core, 41 Negative electrode mixture layer, 50 Potassium-salt sheet

The invention claimed is:

1. A sealed battery, comprising:
an electrode assembly;
a bottomed cylindrical outer housing can housing the electrode assembly; and
a sealing assembly sealing an opening of the outer housing can, wherein
in a bottom of the outer housing can or in the sealing assembly, an exhaust structure is provided to exhaust a gas when an internal pressure of the outer housing can exceeds a predetermined threshold, and
the sealed battery comprises:
a potassium-salt sheet that is a plate member, the potassium-salt sheet including a potassium salt and a binder, the potassium-salt sheet being disposed between: an end surface of the electrode assembly; and the bottom of the outer housing can provided with the exhaust structure or the sealing assembly provided with the exhaust structure; and
an insulating plate having a through hole, the insulating plate being disposed between an end surface of the electrode assembly and the potassium-salt sheet.

2. The sealed battery according to claim 1, wherein the exhaust structure is provided in the sealing assembly, and
the potassium-salt sheet and two insulating plates to sandwich the potassium-salt sheet are disposed between one end surface of the electrode assembly and the sealing assembly.

3. The sealed battery according to claim 1, wherein the exhaust structure is provided in the bottom of the outer housing can, and
the potassium-salt sheet and an insulating plate are stacked and disposed between the other end surface of the electrode assembly and the bottom of the outer housing can in this order from a side of the bottom.

4. The sealed battery according to claim 1, wherein the potassium salt is at least one selected from the group consisting of tripotassium citrate and dipotassium citrate.

5. The sealed battery according to claim 1, wherein a battery capacity is from 2 to 4 Ah, and
a mass of the potassium salt included in the outer housing can is from 0.5 to 3.0 g.

* * * * *